(12) United States Patent
Zalanka et al.

(10) Patent No.: US 11,987,290 B2
(45) Date of Patent: May 21, 2024

(54) SUSPENSION CONNECTION WELDMENT

(71) Applicant: Caterpillar Inc., Peoria, IL (US)

(72) Inventors: David O. Zalanka, Mt. Zion, IL (US); Timothy D. Harman, Forsyth, IL (US)

(73) Assignee: Caterpillar Inc., Peoria, IL (US)

( * ) Notice: Subject to any disclaimer, the term of this patent is extended or adjusted under 35 U.S.C. 154(b) by 78 days.

(21) Appl. No.: 17/944,442

(22) Filed: Sep. 14, 2022

(65) Prior Publication Data

US 2024/0083505 A1 Mar. 14, 2024

(51) Int. Cl.
*B62D 21/11* (2006.01)
*B62D 65/12* (2006.01)

(52) U.S. Cl.
CPC .............. *B62D 21/11* (2013.01); *B62D 65/12* (2013.01)

(58) Field of Classification Search
CPC ........ B62D 21/11; B62D 65/12; B62D 21/09; B62D 25/088
See application file for complete search history.

(56) References Cited

U.S. PATENT DOCUMENTS

| | | | |
|---|---|---|---|
| 10,300,948 B2 | 5/2019 | Ashraf et al. | |
| 11,247,732 B2 | 2/2022 | Asai et al. | |
| 11,370,263 B2 | 6/2022 | Miller | |
| 11,420,493 B2 | 8/2022 | Miller | |
| 2021/0122211 A1 | 4/2021 | Miller | |
| 2022/0250685 A1 | 8/2022 | Li et al. | |

FOREIGN PATENT DOCUMENTS

| | | |
|---|---|---|
| CN | 109229211 | 1/2019 |
| CN | 110562324 | 12/2019 |
| CN | 209833775 U | 12/2019 |
| CN | 111746645 | 10/2020 |
| CN | 111791953 | 10/2020 |
| CN | 113085523 | 7/2021 |
| CN | 216468076 | 5/2022 |
| JP | 2008143252 A | 6/2008 |

OTHER PUBLICATIONS

Written Opinion and International Search Report for Int'l. Patent Appln. No.PCT/US2023/073131, dated Dec. 13, 2023 (10 pgs).

*Primary Examiner* — Jason D Shanske
*Assistant Examiner* — Matthew James O'Neill (57) ABSTRACT

A suspension connection weldment may include a cross member having a first end and a second end and a pair of substantially parallel flank walls spaced apart from one another and arranged at respective first and second ends of the cross member. The flank walls may extend upward and forward from the respective first and second ends of the cross member and generally orthogonal to the cross member. The flank walls may include a plurality of vertically extending rib elements spaced horizontally along respective flank walls from a rear side of the flank wall to a front side of the flank wall. Each rib element may include an upper bore in an upper end and a lower bore in a lower end. The upper and lower bores may be configured to receive a suspension connecting pin.

20 Claims, 6 Drawing Sheets

SUSPENSION CONNECTION WELDMENT

TECHNOLOGICAL FIELD

The present application relates generally to support systems for vehicles and, in particular, work machines such as trucks, haul trucks, and articulated trucks. More particularly, the present application relates to support frames for supporting a body, truck bed, cab, platform, and other structures relative to a suspension system on a work machine. Still more particularly, the present application relates to particular aspects of the support frame including front portions of the support frame that may interact with a front suspension and/or support frontal aspects of the work machine.

BACKGROUND

Vehicle and/or work machine frames can be intricate structures with multiple parts and pieces arranged at a variety of angles relative to one another to accommodate loading points from the work machine body, truck bed, bumper rails, cabs, hydraulic cylinders, suspension components including shocks or struts, A-bars, and other features. Loading on vehicle or work machine frames can be unpredictable and difficult to assess resulting in inefficient designs that include excessively thick or oversized plates, tubes, bars, or other structures. These excessively thick or oversized structures can create a need for correspondingly oversized welds, which can generate a lot of heat during the manufacturing process resulting in warpage of the component, weldment, or frame.

US Patent Application No. 2021/0122211 relates to a space frame front lower suspension connection. A front lower suspension connection for a space frame comprises a U-shaped base and upper suspension control arm support sections on the U-shaped base. The U-shaped base can have a cross-beam section and suspension column support beam sections positioned at opposite ends of the cross-beam section. Each upper suspension control arm support section can have a first support column and a second support column spaced from the first support column. Generally, the prime mover may be provided in a space 21 of the space frame 20 at a front 26 of the space frame 20. The front mounting surfaces 2940 can be adapted to have fixedly attached (e.g., weldably attached) thereto one or more elongate support members. For instance, FIGS. 4-8 show front mounting surfaces 2940 being adapted to have six elongate support members, four elongate support members 203 and two elongate support members 202, extending therefrom. Elongate support members 203 may extend horizontally or substantially horizontally (e.g., 1-2 degrees from horizontal). Elongate support members 202 may extend at an angle, for instance, an acute angle relative to horizontal.

SUMMARY

In one or more examples, a suspension connection weldment may include a cross member having a first end and a second end and a pair of substantially parallel flank walls spaced apart from one another and arranged at respective first and second ends of the cross member. The flank walls may extend upward and forward from the respective first and second ends of the cross member and generally orthogonal to the cross member. The flank walls may include a plurality of vertically extending rib elements spaced horizontally along respective flank walls from a rear side of the flank wall to a front side of the flank wall. Each rib element may include an upper bore in an upper end and a lower bore in a lower end. The upper and lower bores may be configured to receive a suspension connecting pin.

In one or more examples, a work machine may include a frame, a power source arranged on the frame, and a wheel and tire assembly operably coupled to the power source and coupled to the frame with a suspension. The frame may include a suspension connection weldment for securing the suspension. The suspension connection weldment may include a cross member having a first end and a second end and a pair of substantially parallel flank walls spaced apart from one another and arranged at respective first and second ends of the cross member. The flank walls may extend upward and forward from the respective first and second ends of the cross member and generally orthogonal to the cross member. The flank walls may include a plurality of vertically extending rib elements spaced horizontally along respective flank walls from a rear side of the flank wall to a front side of the flank wall. Each rib element may include an upper bore in an upper end and a lower bore in a lower end. The upper and lower bores may be configured to receive a suspension connecting pin.

In still other examples, a method of manufacturing a weldment may include creating a central portion of a cross member including a steering balcony and creating a pair of flank walls comprising a plurality of vertically extending rib elements spaced horizontally along respective flank walls from a rear side of the flank wall to a front side of the flank wall. The method may also include machining a plurality of steering linkage bores in the steering balcony of the central portion and a plurality of suspension pin bores in upper ends of the rib elements and lower ends of the rib elements. After machining, the method may include assembling the central portion between the pair of flank walls.

DETAILED DESCRIPTION

Figure 1:
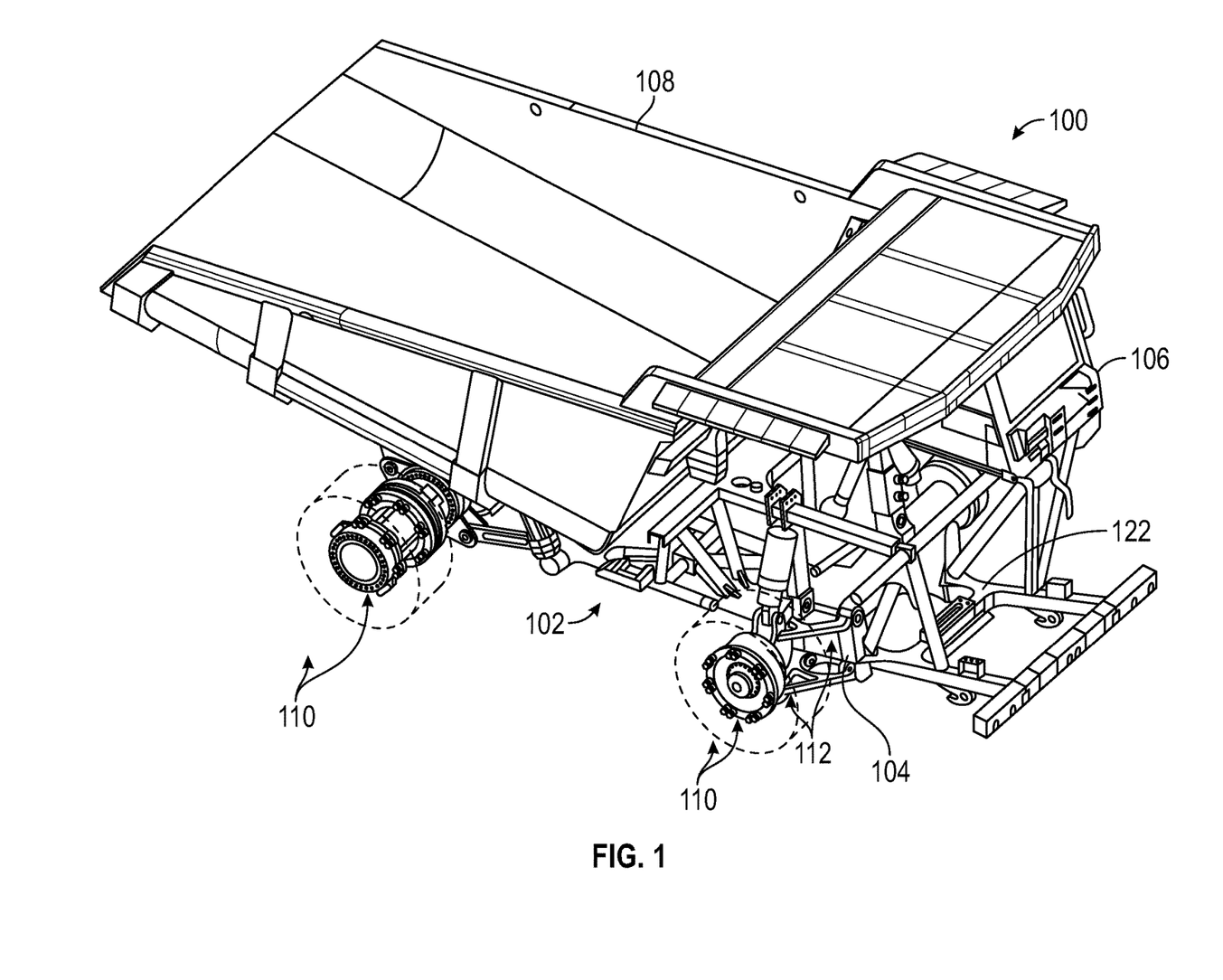
FIG. 1 is a perspective view of a work machine having a support frame with a suspension connection weldment, according to one or more examples.

FIG. 1 is a front perspective view of a work machine 100 having a support frame 102 with a suspension connection weldment 104, according to one or more examples. The work machine 100 may include haul truck, for example, or another type of work machine may be provided. The work machine 100 may include a prime mover arranged on the support frame 102 in addition to a cab or operator station 106 and a dump body or truck bed 108. The dump body or truck bed 108 may be operably coupled to the support frame 102 such as by a pivot connection and an actuator for pivoting the dump body 108 about the pivot connection to dump material out of the dump body 108. The work machine 100 may also include a ground engaging traction system such as one or more wheel and tire assemblies 110 (tires shown in phantom line to provide for frame viewing). The wheel and tire assemblies 110 may be operably coupled to the support frame 102 via a suspension 112. The prime mover may be operably coupled to the one or more wheel and tire assemblies 110 such as by way of a transmission, drive train, drive axle, and/or other components, for example.

Figure 2:
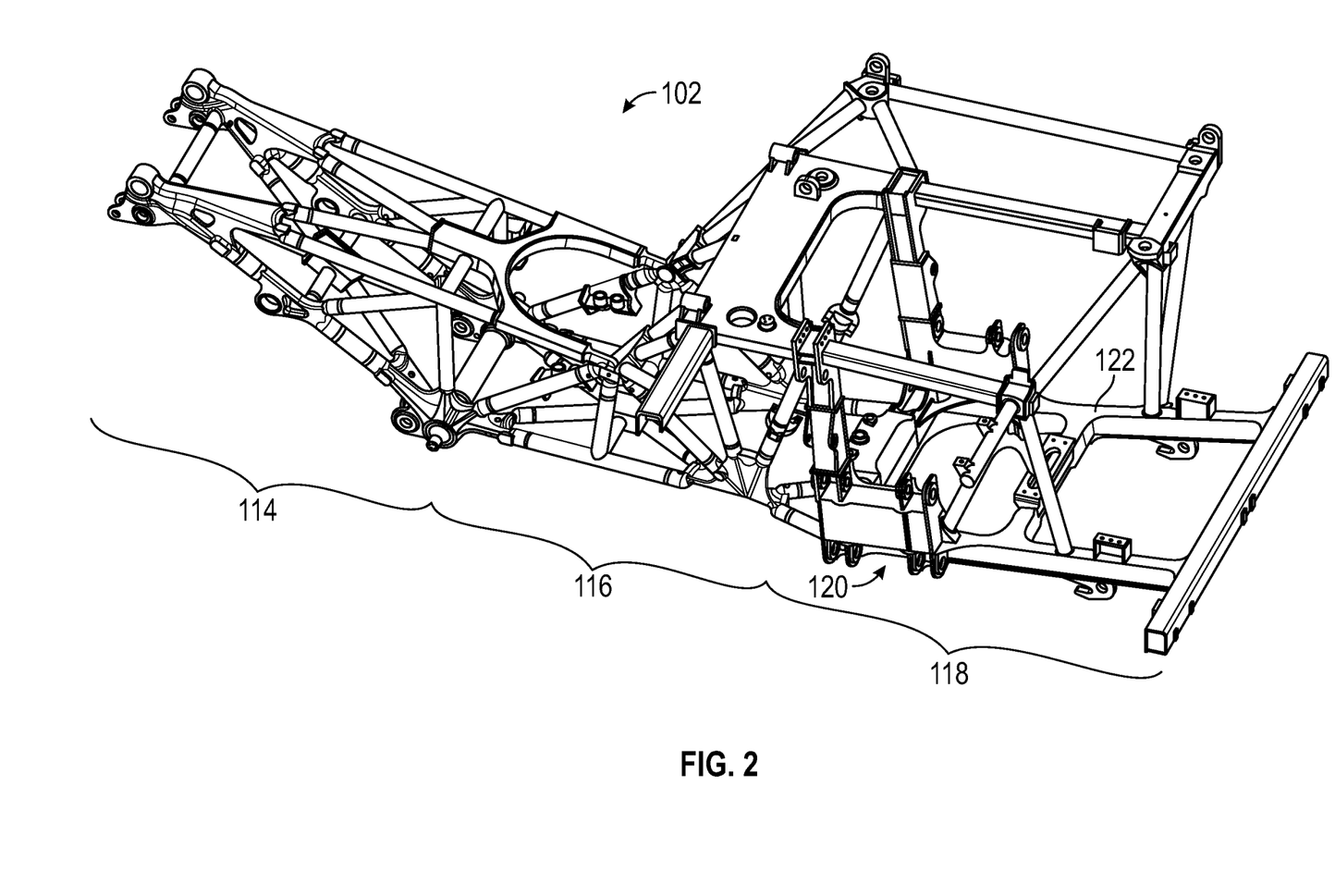
FIG. 2 is a perspective view of the support frame in isolation from the work machine of FIG. 1, according to one or more examples.

Turning now to FIG. 2, the support frame 102 is shown. The support frame 102 may be configured to support the work machine 100 and all components thereof relative to a suspension system 112 coupling the support frame 102 to the wheel and tire assemblies 110. As shown, the support frame 102 may include a rear portion 114 for pivotally coupling and supporting the dump body 108 as well as coupling of a rear suspension system for rear wheel and tire assemblies 110. The frame 102 may also include a central portion 116 for bridging between front and rear wheel and tire assemblies 110 and supporting the loads from the dump body 108. The frame 102 may also include a front portion 118 for coupling of a front suspension system 112 for the front wheel and tire assemblies 110 as well as for supporting the prime mover, cab, and other frontal aspects of the work machine 100. As shown, and with particular regard to the front wheel and tire assemblies 110 and front suspension 112, a suspension connection weldment 120 may be provided in the front portion 118 of the space frame 102.

While not shown in detail, the front wheel and tire assemblies 110 may be secured to the support frame 102 and, in particular, to the suspension connection weldment 120 with bar linkages such as upper and lower A-bars, for example. The A-bars, being part of the suspension 112, may provide for relative up and down motion of a respective wheel and tire assembly 110 and the support frame 102 where the A-bars are pivotally connected to the support frame 102 at the suspension connection weldment 120. The amount of relative motion of the wheel and tire assembly 110 may be controlled by another portion of the suspension system 112 including a shock and strut, for example. The A-shape of the A-bars may provide for transfer of forward and reverse forces between the wheel and tire assemblies 110 and the support frame 102. These may include acceleration and deceleration forces induced by the prime mover and/or a braking system on the work machine 100, but may also include sometimes much larger forces imparted from surface irregularities or other obstructions encountered by the wheel and tire assemblies 110 while the work machine is in motion. The A-bars may also function to transfer lateral forces acting in a direction generally perpendicular to the travel direction of the work machine 100. As shown, the A-bars may be secured to the suspension connection weldment 120 at the front portion 118 of the support frame 102.

Figure 3:
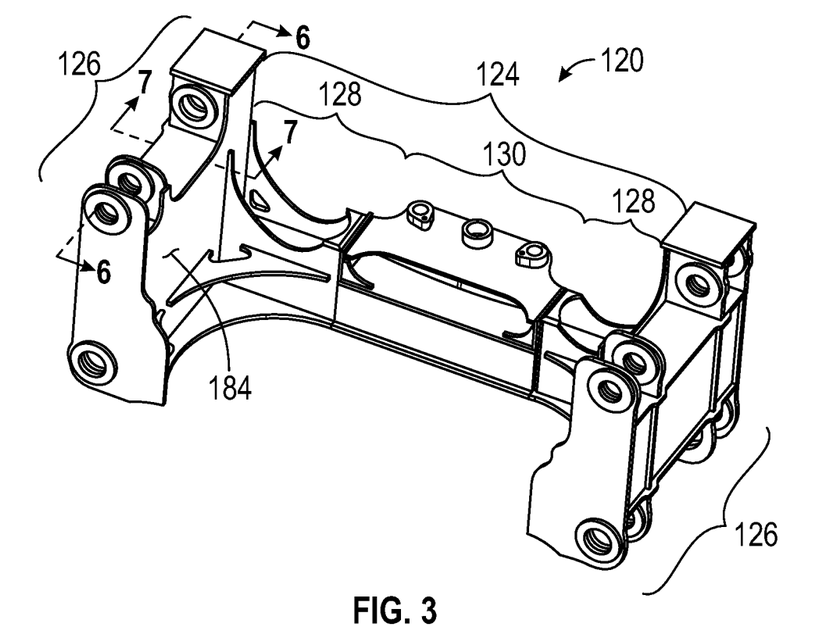
FIG. 3 is perspective view of the suspension connection weldment of the support frame of FIGS. 1 and 2, according to one or more examples.

FIG. 3 is a perspective view of the suspension connection weldment 120 in isolation from the other aspects of the support frame 102. The suspension connection weldment 120 may be configured for pivotal connection of the A-bars of the front suspension assembly 112, for connection of steering linkage, and for managing the forces imparted on the support frame 102 from the A-bars of the front suspension assembly 112. The suspension connection weldment 120 may also function to support a front rail assembly 122 (shown in FIGS. 1 and 2) that extends in a forward direction from the weldment 120. As shown, the suspension connection weldment 120 may generally include a cross member 124 and a pair of flank walls 126 extending forward and upward from the cross-member 124.

Figure 4:
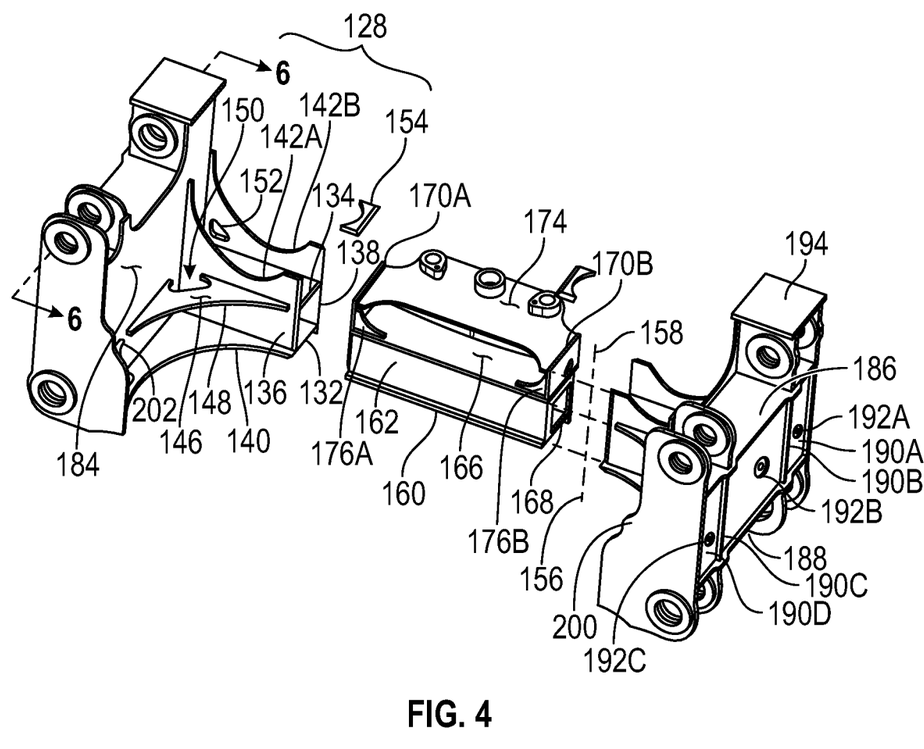
FIG. 4 is an exploded view of the suspension connection weldment of FIG. 3.

The cross member 124 may form a generally central portion of the suspension connection weldment 120 and may be configured to hold the respective flank walls 126 of the weldment 120 together and maintain them in a parallel condition relative to one another. The cross member 124 may also be configured for attaching of one or more aspects of a steering system. As shown, the cross member 124 may be a generally rectangular element when viewed in cross-section. However, as shown in FIG. 4, the weldment may be assembled in sub-assemblies and the cross-section of the cross member 124 may vary along its length.

A first example of the varying cross-section is an outboard portion 128 of the cross member 124. That is, and as shown in FIG. 4, the outboard portion 128 of the cross member 124 on either side of a central portion 130 may include a bottom plate 132, a top plate 134, and two side plates including a front side plate 136 and a rear side plate 138. In one or more examples, the bottom plate 132 may include a front edge 140 arranged slightly forward of the front side plate 136 so as to cause a bottom edge of the front side plate to abut a top surface of the bottom plate 132. In contrast, the rear edge of the bottom plate may align with a front surface of the rear side plate 138 allowing the bottom edge of the rear side plate to be arranged slightly below the bottom plate. Both the front side plate 136 and the rear side plate 138 may extend upward to respective upper edges 142A/B arranged above the top plate 134 such that the top plate 134 is arranged between the front and rear side plates 136/138.

Figure 5:
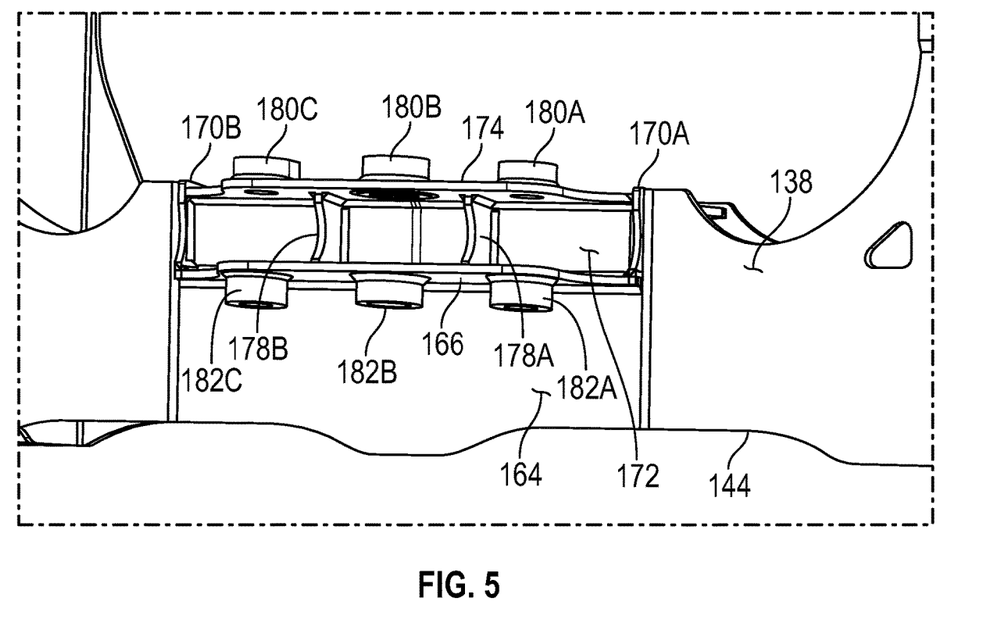
FIG. 5 is a side view of the suspension connection weldment of FIG. 3.

One or more of the plates may include profiled edges for managing stresses in the associated welds and the plates themselves. For example, the top edge 142A/B of the front side and rear side plates 136/138 may be a profiled edge that extends generally horizontally away from the central portion 130 for a relatively short distance and then follows a radius or curve cutting downward into the body of the plate and continuing until the curve causes the edge to swoop upward until becoming generally parallel to a respective flank wall 126. The top edge 142A/B may have a top end arranged substantially above the cross member 124 and may have a short, horizontally extending, return at a top end thereof. The front edge 140 of the bottom plate 132 may also have a profiled edge for managing weld stresses and plate stresses. The front edge 140 may extend generally horizontally away from the central portion 130 and may follow a radius or other curve transitioning the front edge 140 to extend in a forward direction along the length and offset from a respective flank wall 126. The curve may cause the front edge 140 to curve inboard (back toward the central portion or a longitudinal axis of the weldment) as it extends to and approaches a front portion of the adjoining flank wall 126. Still further, and as shown in FIG. 5, the bottom edge 144 of the rear side plate 138 may extend generally horizontally away from the central portion 130 and may curve downward to a level further below the bottom plate 132 where it may return to extending horizontally to a respective flank wall 126.

The outboard portion 128 of the cross member 124 may also include a profiled gusset plate 146 aligned with the top plate 134 and on a front side of the front side plate 136. The gusset plate 146 may include a radiused or curved edge 148 transitioning from generally parallel to the central portion 130 to generally parallel to an adjoining flank wall 126 and forming a generally triangular gusset with a curved hypotenuse. In addition, a cutout 150 may be provided in the gusset 146 near the intersection of the cross member 124, the flank wall 126, and the gusset 146. In one or more examples, the rear side plate 138 of the outboard portion 128 of the cross member 124 may include a triangular cutout 152 arranged above the top plate 134. Still further, a stiffener 154 may be provide between the upper edges of the front and rear side plates 136/138 adjacent the central portion 130. That is, as shown, a stiffener plate 154 with a generally straight inboard edge may be provided with a front edge and a rear edge extending away from the central portion 130 and generally perpendicular to the straight inboard edge of the stiffener 154. A profiled edge may be provided on an outboard side of the stiffener 154. The profiled edge may extend generally perpendicularly rearward from the front side plate 136 for a short distance, or no distance at all, and a radiused or curved profile may cut into the plate as the edge extends rearward before then returning outboard due to the curvature and before reaching the rear edge of the stiffener 154.

Figure 6:
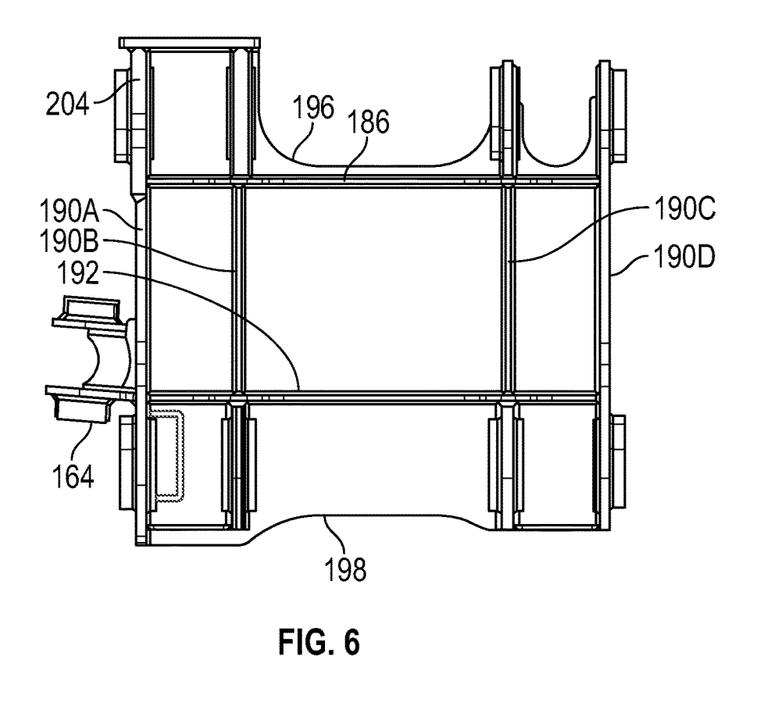
FIG. 6 is a partial rear view of the suspension connection weldment of FIG. 3.
Figure 7:
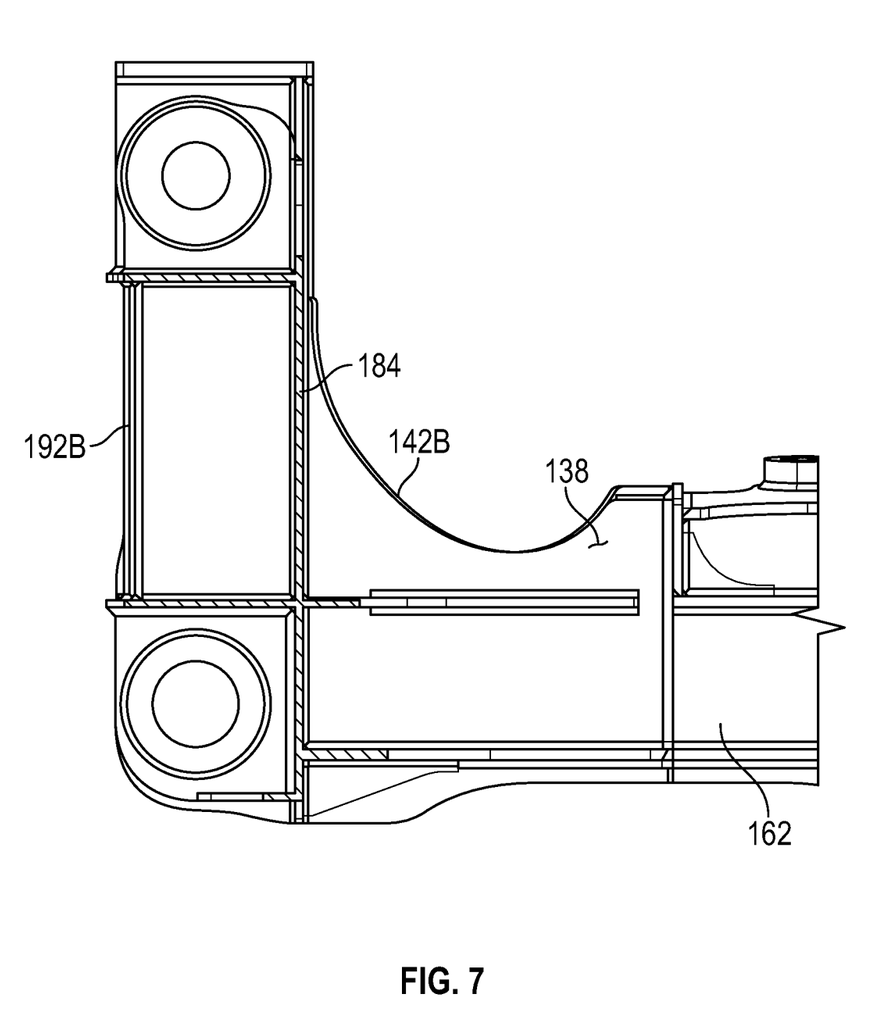
FIG. 7 is a partial cross-section view of the suspension connection weldment of FIG. 2.
Figure 8:
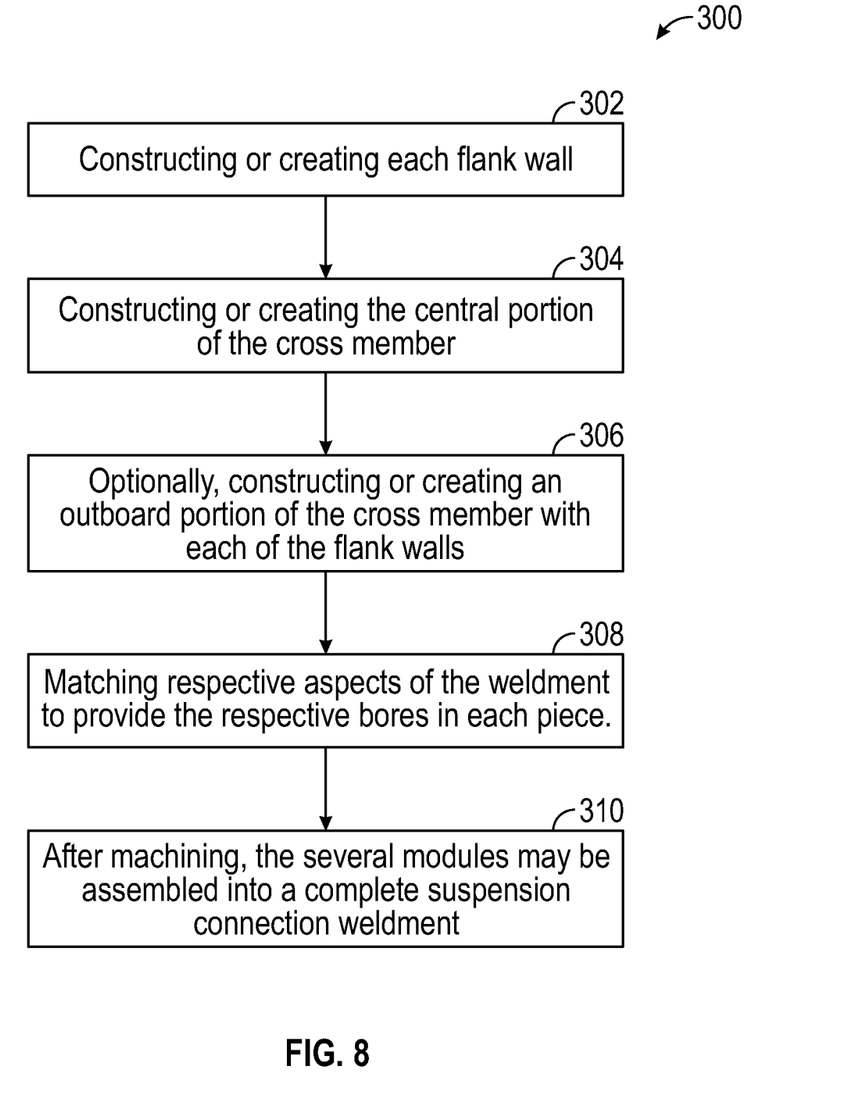
FIG. 8 is a diagram depicting a method of manufacturing a suspension connection element.

As another example of a portion of the cross member 124 with a varying cross-section, the central portion 130 of the cross member 124 may include a lower level 156 and an upper level 158. The lower level 156 may have a similar cross-section and plate details as the outboard portion 128 of the cross member 130. In particular, the lower level 156 of the central portion 130 of the cross member 124 may have similar details at the bottom when compared to the outboard portion 128 of the cross member 124. That is, the bottom plate 160 of the central portion 130 may extend forward of the front side plate 162 and may have a rear edge aligned with a forward surface of the rear side plate 164. However, at the top of the cross section, the front and rear side plates 162/164 may stop at an under side of the top plate 166 rather than extending above the top plate 166. As such, the top plate 166 may extend slightly forward of the front side plate 162 and at the rear side may extend substantially rearward of the rear side plate forming a steering balcony floor shown in FIG. 5 and discussed in more detail below. The top plate 166 may be bent slightly upward as it crosses the rear side plate 164 to form a slightly canted balcony floor as shown in FIG. 6. The central portion 130 may also include an alignment ring 168 on each end thereof for purposes of aligning the central portion 130 with the outboard portions 128 at each end and for providing a backup to the weld encircling the joint between the central portion 130 and the outboard portions 128. The alignment ring 168 may be sized and shaped to fit within an inner boundary of the bottom, top, front side, and rear side plates 132/134/136/138 of the outboard portion 128 of the cross member 130.

The upper level 158 of the central portion 130 may be defined by a pair of end plates 170A/B, another rear side plate 172 (see FIG. 5) aligned above the rear side plate 164 of lower level 156, a roof plate 174, and a pair of front side gussets 176A/B. The end plates 170A/B may extend upward from a top surface of the top plate 166 of the lower level 156. Similarly, the gussets 176A/B may be arranged on a top surface of the top plate 166 of the lower level 156 and may be arranged to abut respective inboard surfaces of the end plates 170A/B so as to brace the end plates 170A/B. The roof plate 174 may frame into the inboard surfaces of the end plates 170A/B and may rest atop an upper edge of the upper level rear side plate 172. That is, the roof plate 174 may partially cover the upper level 158 of the central portion 130 of the cross member 124 and may extend rearward above the steering balcony floor beyond the rear side plate 172 of the upper level 158. As shown best in FIGS. 4 and 6, the roof plate 174 may be canted slightly upward as it extends rearwardly. In addition, each end of the front edge of the roof plate 174 may extend generally perpendicularly from the end plates 170A/B for a short distance and then may follow a radius or curve cutting into the body of the roof plate until again becoming perpendicular to the end plates. The gussets 176A/B may have a similar radius edge. Each end of the rear edge of the roof plate may extend generally perpendicular to the end plates 170A/B, but may more immediately follow a radius turning rearward to cause the roof plate 174 to extend out above the balcony floor. The radiused edge may reach an inflection point when extending generally parallel to the end plates 170A/B and may immediately curve the opposite direction until becoming generally perpendicular to the end plates 170A/B and forming a rear most edge of the roof plate 174.

As shown in FIG. 5, the top plate 166 of the lower level 156 and the roof plate 174 may form a balcony extending from a rear side of the central portion 130 of the cross member 124. The rear edge of the top plate 166 of the lower level 156 forming a steering balcony floor may follow a same or similar profile as the rear edge of the roof plate 174 so as to be aligned one above the other. As shown, the end plates 170A/B of the upper level 158 of the central portion 130 of the cross member 124 may extend rearward beyond the rear side plate of the upper level 158. In addition, a pair of pilaster plates 178A/B may be arranged approximately at third points across the balcony and extending from the balcony floor to an underside of the roof plate 174. The roof plate 174 may include one or more upper steering lugs 180A/B/C on a top surface thereof and the top plate 166 of the lower level 156 may include one or more lower steering lugs 182A/B/C on a bottom surface thereof. The lugs 180A/B/C on the roof plate 174 and the lugs 182A/B/C on the top plate 166 may each include a bore extending vertically through the lug and bores of the upper lugs 180A/B/C may be aligned with respective bores on the lower lugs 182A/B/C.

The flank walls 126 may be mirror images of each other and, as such, a single flank wall will be described. The flank walls 126 may be configured to extend forward and upward from respective outboard portions 128 of the cross member 124 and engage with pins, bolts, or other fasteners securing the A-bars of the suspension to the weldment 120. As such, the flank walls 126 may include a series of bores arranged along a top portion of the wall 126 and another series of bores arranged along a bottom portion of the wall 126. As shown in FIG. 4, each flank wall 126 may include an inboard plate 184, an upper platform 186, a lower platform 188, a plurality of spaced apart rib elements 190A/B/C/D extending upward along the outboard side of the inboard plate 184 interrupted by the upper platform 186 and the lower platform 188, a plurality of closure plates 192A/B/C, and a column cap 194.

The inboard plate 184 may form an inboard surface of the flank wall 126 and may be adapted for interfacing with the cross-member 124 and its associated gussets. In one or more examples, the inboard plate 184 may be a substantially uninterrupted plate meaning there that intersecting plates do not extend through the inboard plate 184 and that there are no openings are other penetrations within an outer boundary of the plate. As shown in FIG. 6, the top edge 196 of the inboard plate 184 may extend generally horizontally from a rear edge for a distance equal to the space between a first rib element 190A and second rib element 190B. Once just passed the second rib element 190B, the top edge 196 may extend generally downward along the second rib element 190B to a radiused or curve transitioning the edge to run just above and along the upper platform 186 to a third rib element 190C. The top edge 196 may then follow a radius or curve to extend upward along the third rib element 190C to a plateau below a top of the third rib element 190C and extending across the rear side of the third rib element 190C. The top edge 196 may then return downward along a curve and back upward along the curve and along the fourth rib element 190D. The curve between third rib element 190C and the fourth rib element 190D may form a U-shape. The top edge 196 may then reach a plateau below a top of the fourth rib element 190D which may cause the top edge to abut into the side of the fourth rib element 190D. A bottom edge 198 of the inboard plate 184 may extend generally horizontally from a rear edge along and below the first and second rib elements 190A/B. The bottom edge 198 may then gradually extend upward along a shallow curve to a level slightly above the bottom of the second rib element 190B and extending generally horizontally across the space between the second and third rib elements 190B/C. As the bottom edge 198 approaches the third rib element 190C, the bottom edge 198 may curve gradually downward to a horizontally extending portion that is generally aligned with the bottom of the third and fourth rib elements 190C/D and extends to a front edge of the flank wall 126.

The upper platform 186 may be arranged to extend substantially continuously along an outboard side of the inboard plate 184 and just below the series of bores in the top of the several rib elements 190A/B/C/D of the flank wall 126. The upper platform 186 may have a substantially straight inboard edge welded to the inboard plate 184. The outboard edge of the upper platform 186 may be arranged across the several outboard edges of the rib elements 190A/B/C/D and may be substantially straight except that the outboard edge may protrude further outboard slightly at each of the second and third rib elements 190B/C to allow for welding across the outboard edges of the rib elements. The lower platform 188 may be substantially similar to the upper platform 186, but may be arranged just above the series of bores in the bottom of the several rib elements 190A/B/C/D of the flank wall 126.

The several rib elements 190A/B/C/D may be configured for connection to upper and lower A-bars of the suspension system and for distributing loads from the A-bars through the height of the flank wall 126. The several rib elements may include a first or rear rib element 190A and a second rib element 190B spaced from the first rib element to receive a lug of an A-bar between the first and second rib elements 190A/B at an upper end and a lower end of the flank wall 126. The several rib elements may also include a fourth or front rib element 190D and a third rib element 190C spaced from the fourth rib element 190D to receive a lug of an A-bar between the third and fourth rib elements 190C/D at an upper end and a lower end of the flank wall 126.

The front or fourth rib element 160D may be a generally uninterrupted plate apart from an upper bore and a lower bore for receiving a pin, bolt, or other fastener to attach an A-bar. As shown, the front rib element 160D may include a generally straight and vertical outboard edge that bulges slightly outward at the bore locations to maintain a sufficient edge distance for the bores. The outboard edge may follow a curved contour around the outboard and top side of the upper bore to maintain the edge distance returning across the top of the bore in a generally horizontal fashion. This top edge of the front rib element 160D may extend inboard beyond the bore and beyond an inboard surface of the inboard plate 184 of the flank wall 126 where it may turn downward with a radiused or curved corner. The edge (now an inboard edge) of the front rib element 160D may extend downward along the inboard plate 184 to about a halfway point where it may curve further inboard and then curve downward again to form a sloped stair or chair 200. The inboard edge may extend downward from the stair or chair 200 a short distance and then curve further inboard to accommodate a gusset 202 between the inboard surface of the inboard plate 184 and a rear surface of the front rib element 190D. Once beyond the gusset 202, the inboard edge of the front rib element 190D may curve downward, extend vertically downward passed the bottom plate, and return in an outboard direction defining a bottom edge. A slight downward curve may be provided as the bottom edge extends further outboard and the bottom edge may then extend generally horizontally passed the lower bore, curving upward around the lower bore to maintain an edge distance and following the contour of the bore to maintain the edge distance until curving inwardly slightly to meet the generally vertical outboard edge.

In contrast to the front or fourth rib elements 190A/D, the second and third rib elements 190B/C may be interrupted ribs and may be interrupted by the upper platform 186 and the lower 188 platform. In one or more examples the second and third rib elements 190C/D may include a lower section, a middle section, and an upper section forming the respective rib elements 190C/D. The overall rib element may have a generally straight and vertical inboard edge as well as a generally straight and vertical outboard edge except that the outboard edge may bend slightly outward at the bore locations to accommodate a selected edge distance.

The first or rear rib element 190A may be partially combined with or be an extension of the rear side plate 138 on the outboard portion 128 of the cross member 124. That is, as described earlier and as shown in FIG. 7, the top edge 142B of the rear side plate 138 of the outboard portion 128 of the cross member 130 may swoop upward until becoming generally parallel to a respective flank wall 126. The top edge 142B may have a top end arranged substantially above the cross member 130 and may have a short, horizontally extending, return at a top end thereof. This return may occur at or near the upper platform 186 of the flank wall 126 and may extend across a rear side of the flank wall 126 such that the rear side plate 138 of the cross member 124 extends across the rear side of a portion of the flank wall 126 and forms a portion of the first or rear rib element 190A. In one or more examples, a separate plate may 204 be provided to complete the upper portion of the first or rear rib element 190A. The separate plate may, for example, be thicker than the rear side plate 138 of the cross member 124 and may extend from the upper platform 186 to a height the same or similar to the top edge 196 of the inboard plate 184 and the second rib element 190B. The referenced column cap 194 may be provided on top of the separate plate 204 forming the top portion of the first or rear rib element 190A, on top of the rear portion of the inboard plate 184 of the flank wall 126, and on top of the second rib 190B.

The plurality of closure plates 192A/B/C may be configured to work with the inboard plate to provide stiffness to the flank wall 126 and distribute loads generally horizontally back to the cross member 124. As shown, the plurality of closure plates 192A/B/C may be arranged along an outboard side of the flank wall 126 and in the bays defined by the intersections of the upper platform 186, the rib elements 190A/B/C/D, and the lower platform 188. That is, the closure plates 192A/B/C may be provided between the upper platform 186 and the lower platform 188 and in each bay between the rib elements 190A/B/C/D. A rear closure plate 192A may be provided between the first/rear rib element 190A and the second rib element 190B, a middle closure plate 192B may be provided between the second and third ribs elements 190B/C, and a front closure plate 192C may be provided between the third and fourth/front rib elements 190C/D.

It is to be appreciated that the suspension connection weldment 120 may be a generally welded component. That is, for example, the several plates or elements of the weldment including those of the cross member 124 and the flank walls 126 may be welded generally with fillet welds extending along the joints between the several elements and/or plates. Still further, where butt joints are provided, or where plate thicknesses warrant, beveled edges of the plates may be provided to allow for sufficient throat thicknesses on the weld or welds.

As mentioned, the suspension connection weldment may be manufactured in modular fashion. For example, as shown in FIG. 4 and described in FIG. 8, a method of manufacturing 300 may include constructing or creating each flank wall 302 and constructing or creating the central portion of the cross member 304. In one or more examples, an outboard portion of the cross member may be constructed with each of the flank walls 306. With each of the portions constructed (e.g., two flank walls/outboard portion of cross member and a central portion), the respective aspects of the weldment may be machined to provide the respective bores in each piece 308. For example, the steering linkage bores may be machined in the central portion and the A-bar connection bores in the flank walls may also be machined. With the respective modules of the weldment machined, the several modules may be assembled into a complete suspension connection weldment 310. For example, the outboard portion of the cross member may be abutted against the end of the central portion. Where an alignment or backer ring is provided, the plates of the outboard portion may be slipped over the backer ring to align the outboard portion with the central portion and to provide a backer plate for the butt weld occurring between the several plates of the outboard portion and the central portion. That is, once properly positioned, a circumferential butt or bevel weld may be provided that extends circumferentially around the joint between the outboard portion and the central portion.

INDUSTRIAL APPLICABILITY

Several advantages of the above-described design give rise to its industrial applicability. That is, on a general level, the above-described suspension connection weldment may be used as part of a frame of a work machine to absorb loading from attached suspension elements and distribute those loads to the frame thereby maintaining the structural integrity of the work machine during use. However, on a more particular level, this approach (e.g., modularity and machining before fully assembly) may reduce problems associated with distortion or warping that may occur when otherwise constructing a suspension connection weldment. That is, by making the modules handleable, the welding of the individual modules may be completed before machining, which may avoid local distortion between bores of a particular module. Moreover, any distortion resulting from welding of the several modules may be less of an issue since, for example, the A-bar is not connected across modules or, as another example, the steering linkage is not connected across modules. That is, if the distortion between the respective bores on the flank wall can be minimized or reduced or if the distortion between the respective bores on the central portion of the cross member can be minimized or reduced, then assembly and use of the weldment is improved because misalignment of bores is avoided or reduced. That is, attachment and performance of A-bars and/or attachment and performance of steering linkages may both be improved. As an aside, other distortions between, for example, the left flank wall and the right flank wall are less of an issue since other components of the machine are not generally attached across these two components.

Further contributing to the industrial applicability, it is to be appreciated that the geometrical arrangement of the several parts of the weldment may provide for substantially efficient load management. For example, the structure of the weldment may provide for direct connection of structural components of the weldment to the suspension pins securing the A-bars to the weldment. More particularly, the rib elements may be structural components that distribute load generally vertically through the flank walls and the pins that secure the A-bars, may be directly connected to these rib elements. Moreover, the geometrical arrangement of the several plates/elements are such that discontinuities in the load path are reduced or minimized. For example, the rib elements are aligned from top to bottom of the weldment providing for a continuous load path between the connection points of the A-bars. Similarly, the upper platform and the lower platform are continuous from the front to the rear of the flank walls. Still further, the first or rear rib element and the second rib element are aligned with the rear side plate and the front side plate of the cross member. Still other continuous load paths are provided through the weldment by alignment of plates or elements throughout a module or section of the weldment and across modules of the weldment. The result of the direct attachment and the avoidance of discontinuous load paths is a much a lighter weight design with, for example, thinner plates and fewer stiffening gussets. In addition, this direct attachment and continuous load path avoids use of hidden plates or welds, which further reduces the weight of the weldment, but also helps to provide visual access to the parts of the weldment for inspection and/or maintenance.

It is to be appreciated that a continuous load path can be provided by alignment of plates even though the plates may not be uninterrupted plates. That is, for example, the rib elements include a series of aligned plates while the upper platform and the lower platform include singular uninterrupted plates, but each may provide a continuous load path without discontinuities. Moreover, the opposite may be provided where the rib elements are uninterrupted plates and the upper platform and lower platform include a series of aligned plates (e.g., where the second and third rib elements extend through the upper platform and/or the lower platform).

Finally, the contoured and/or curved edges of the several plates of the weldment including main plates or elements of the weldment and supporting gussets can aid in the efficiency of the design. For example, the contoured and/or curved edges may help to avoid stress concentrations near corners or in joints and may help to provide resistance to loading closer to the centers of the elements and away from the edges or in the welds. This can substantially improve the fatigue life of the weldment by absorbing or resisting loading at locations where fatigue loading or repetitive loading has less of an effect on the life of the weldment.

The above detailed description is intended to be illustrative, and not restrictive. The scope of the disclosure should, therefore, be determined with references to the appended claims, along with the full scope of equivalents to which such claims are entitled.

What is claimed is:

1. A suspension connection weldment, comprising:
a cross member having a first end and a second end; and
a pair of substantially parallel flank walls spaced apart from one another and arranged at respective first and second ends of the cross member, the flank walls extending upward and forward from the respective first and second ends of the cross member and generally orthogonal to the cross member, the flank walls comprising a plurality of vertically extending rib elements spaced horizontally along respective flank walls from a rear side of the flank wall to a front side of the flank wall, wherein each rib element includes an upper bore in an upper end and a lower bore in a lower end, the upper and lower bores being configured to receive a suspension connecting pin.

2. The suspension connection weldment of claim 1, wherein the cross member comprises a front side plate and a rear side plate and the plurality of vertically extending rib elements comprises a first rib element aligned with the rear side plate and a second rib element aligned with the front side plate.

3. The suspension connection weldment of claim 2, wherein the rear side plate extends across a rear side of a flank wall of the pair of flank walls and comprises a portion of the first rib element.

4. The suspension connection weldment of claim 2, wherein the pair of flank walls each comprise a third rib element and a fourth rib element.

5. The suspension connection weldment of claim 4, wherein the pair of flank walls each comprise a substantially uninterrupted inboard plate extending between a front surface of the rear side plate and a rear surface of the fourth rib element.

6. The suspension connection weldment of claim 1, further comprising an upper platform extending generally horizontally along each of the pair of flank walls, the upper platform being arranged below the upper bores of the rib elements.

7. The suspension connection weldment of claim 6, further comprising a lower platform extending generally horizontally along each of the pair of flank walls, the lower platform being arranged above the lower bores of the rib elements.

8. The suspension connection weldment of claim 7, wherein the rib elements, the upper platform, and the lower platform form a plurality of bays below the upper platform, above the lower platform, and between the respective rib elements.

9. The suspension connection weldment of claim 8, further comprising a plurality of closure plates in the plurality of bays.

10. The suspension connection weldment of claim 1, wherein the cross member comprises a steering balcony arranged on a rear side thereof.

11. A work machine comprising:
a frame;
a power source arranged on the frame; and
a wheel and tire assembly operably coupled to the power source and coupled to the frame with a suspension, wherein the frame comprises a suspension connection weldment for securing the suspension, the suspension connection weldment comprising:
a cross member having a first end and a second end; and
a pair of substantially parallel flank walls spaced apart from one another and arranged at respective first and second ends of the cross member, the flank walls extending upward and forward from the respective first and second ends of the cross member and generally orthogonal to the cross member, the flank walls comprising a plurality of vertically extending rib elements spaced horizontally along respective flank walls from a rear side of the flank wall to a front side of the flank wall, wherein each rib element includes an upper bore in an upper end and a lower bore in a lower end, the upper and lower bores being configured to receive a suspension connecting pin.

12. The work machine of claim 11, wherein the suspension connection weldment further comprises an upper platform extending generally horizontally along each of the pair of flank walls, the upper platform being arranged below the upper bores of the rib elements.

13. The work machine of claim 12, wherein the suspension connection weldment further comprises a lower platform extending generally horizontally along each of the pair of flank walls, the lower platform being arranged above the lower bores of the rib elements.

14. The work machine of claim 13, wherein the rib elements, the upper platform, and the lower platform form a plurality of bays below the upper platform, above the lower platform, and between the respective rib elements.

15. The work machine of claim 14, wherein the suspension connection weldment further comprises a plurality of closure plates in the plurality of bays.

16. A method of manufacturing a weldment, comprising:
creating a central portion of a cross member including a steering balcony;
creating a pair of flank walls comprising a plurality of vertically extending rib elements spaced horizontally along respective flank walls from a rear side of the flank wall to a front side of the flank wall;
machining a plurality of steering linkage bores in the steering balcony of the central portion and a plurality of suspension pin bores in upper ends of the rib elements and lower ends of the rib elements; and
after machining, assembling the central portion between the pair of flank walls.

17. The method of claim 16, wherein creating a pair flank walls comprises forming an outboard portion of the cross member on an inboard side thereof.

18. The method of claim 17, wherein assembling the central portion between the pair of flank walls comprises welding the central portion between the respective outboard portions of the flank walls.

19. The method of claim 16, wherein the pair of flank walls comprise an upper platform and a lower platform.

20. The method of claim 19, wherein the upper platform, the lower platform, and the plurality of vertically extending rib elements define a plurality of bays and the pair of flank walls further comprise a plurality of closure plates.

* * * * *